(12) United States Patent
Hauser et al.

(10) Patent No.: US 7,392,654 B1
(45) Date of Patent: Jul. 1, 2008

(54) ZERO TURN DRIVE APPARATUS

(75) Inventors: Raymond Hauser, Sullivan, IL (US); Lonnie E. Holder, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 442 days.

(21) Appl. No.: 11/117,912

(22) Filed: Apr. 29, 2005

Related U.S. Application Data

(63) Continuation-in-part of application No. 10/788,534, filed on Feb. 27, 2004, now Pat. No. 6,973,783.

(51) Int. Cl.
*B60K 17/10* (2006.01)
*F04B 1/20* (2006.01)

(52) U.S. Cl. .............. 60/484; 60/486; 60/487

(58) Field of Classification Search ............ 60/484, 60/486, 487
See application file for complete search history.

(56) References Cited

U.S. PATENT DOCUMENTS

| | | | |
|---|---|---|---|
| 1,539,616 A | 5/1925 | Williams | |
| 2,875,701 A | 3/1959 | Ebert | |
| 2,914,219 A | 11/1959 | Chiantelassa | |
| 3,775,981 A * | 12/1973 | Molly | 60/490 |
| 3,922,931 A | 12/1975 | Osujyo et al. | |
| 4,129,192 A * | 12/1978 | Todeschini et al. | 60/486 |
| 4,252,508 A | 2/1981 | Forster | |
| 4,270,480 A | 6/1981 | Hancock et al. | |
| 4,534,271 A | 8/1985 | Forster | |
| 4,819,508 A | 4/1989 | Yamaoka et al. | |
| 4,893,524 A | 1/1990 | Ohashi et al. | |
| 4,971,535 A | 11/1990 | Okada et al. | |
| 5,040,429 A | 8/1991 | Del Castillo | |
| 5,078,222 A | 1/1992 | Hauser et al. | |
| 5,207,060 A | 5/1993 | Sheets | |
| 5,247,794 A | 9/1993 | Benson et al. | |
| 5,304,043 A | 4/1994 | Shilling | |
| 5,354,180 A | 10/1994 | Forster | |
| 5,501,578 A | 3/1996 | Skirde | |
| 5,542,307 A | 8/1996 | Hasegawa et al. | |
| 5,800,134 A | 9/1998 | Hasegawa et al. | |

(Continued)

FOREIGN PATENT DOCUMENTS

EP 1 473 173 A2 3/2004

(Continued)

OTHER PUBLICATIONS

Dixie Choper, Operation Manual 1998, Cover Page and pp. 50-51, 60-61, 66 Revision #5 Feb. 1998.

*Primary Examiner*—Igor Kershteyn
(74) *Attorney, Agent, or Firm*—Neal, Gerber & Eisenberg LLP

(57) ABSTRACT

A drive apparatus for a zero turn vehicle or similar application comprising a pair of pumps mounted in a common housing and having coaxial input shafts and a main input shaft mounted in the common housing perpendicular to the two pump shafts. A pair of center sections or end caps including hydraulic porting are mounted to opposite ends of the common housing, and each center section has a hydraulic motor mounted thereon external to the common housing. A power take off unit may also be mounted to the common housing and driven by the main input shaft.

23 Claims, 16 Drawing Sheets

U.S. PATENT DOCUMENTS

| | | | |
|---|---|---|---|
| 6,022,198 | A | 2/2000 | Hoffmeister |
| 6,199,380 | B1 | 3/2001 | Ishii |
| 6,301,885 | B1 | 10/2001 | Johnson et al. |
| 6,332,393 | B1 | 12/2001 | Trimble |
| 6,361,282 | B1 | 3/2002 | Wanschura |
| 6,363,815 | B1 | 4/2002 | Ishimaru et al. |
| 6,382,339 | B1 | 5/2002 | Nemoto |
| 6,425,244 | B1 | 7/2002 | Ohashi et al. |
| 6,474,218 | B2 | 11/2002 | Saito et al. |
| 6,487,856 | B1 | 12/2002 | Ohashi et al. |
| 6,494,686 | B1 | 12/2002 | Ward |
| 6,672,058 | B1 | 1/2004 | Langenfeld et al. |
| 6,672,843 | B1 | 1/2004 | Holder et al. |
| 6,705,840 | B1 | 3/2004 | Hauser et al. |
| 6,736,605 | B2 | 5/2004 | Ohashi et al. |
| 6,877,302 | B2 | 4/2005 | Samejima et al. |
| 7,147,810 | B2 * | 12/2006 | Reinhard et al. .............. 264/81 |
| 7,162,870 | B1 * | 1/2007 | Hauser ........................ 60/484 |
| 2003/0188909 | A1 | 10/2003 | Ohashi et al. |
| 2004/0200657 | A1 | 10/2004 | Stoll et al. |
| 2004/0221573 | A1 | 11/2004 | Ohashi et al. |
| 2004/0237490 | A1 | 12/2004 | Yasuda et al. |
| 2005/0016304 | A1 | 1/2005 | Ishii et al. |

FOREIGN PATENT DOCUMENTS

| | | |
|---|---|---|
| JP | 2000009023 A | 1/2000 |
| JP | 2001-146951 | 5/2001 |
| JP | 2001-263259 | 9/2001 |
| WO | WO99/67532 | 12/1999 |

* cited by examiner

ZERO TURN DRIVE APPARATUS

CROSS REFERENCE TO RELATED APPLICATION

This application is a continuation-in-part of U.S. patent Ser. No. 10/788,534, filed Feb. 27, 2004, U.S. Pat. No. 6,973,783, issued Dec. 13, 2005, which is incorporated herein by reference in its entirety.

BACKGROUND OF THE INVENTION

This invention relates to hydraulic pump and motor assemblies.

SUMMARY OF THE INVENTION

A zero turn drive apparatus comprising dual tandem pumps and corresponding hydraulic motors is disclosed herein. The details of this invention are set forth below in connection with the detailed description of the embodiments.

DETAILED DESCRIPTION OF THE DRAWINGS

Figure 1:
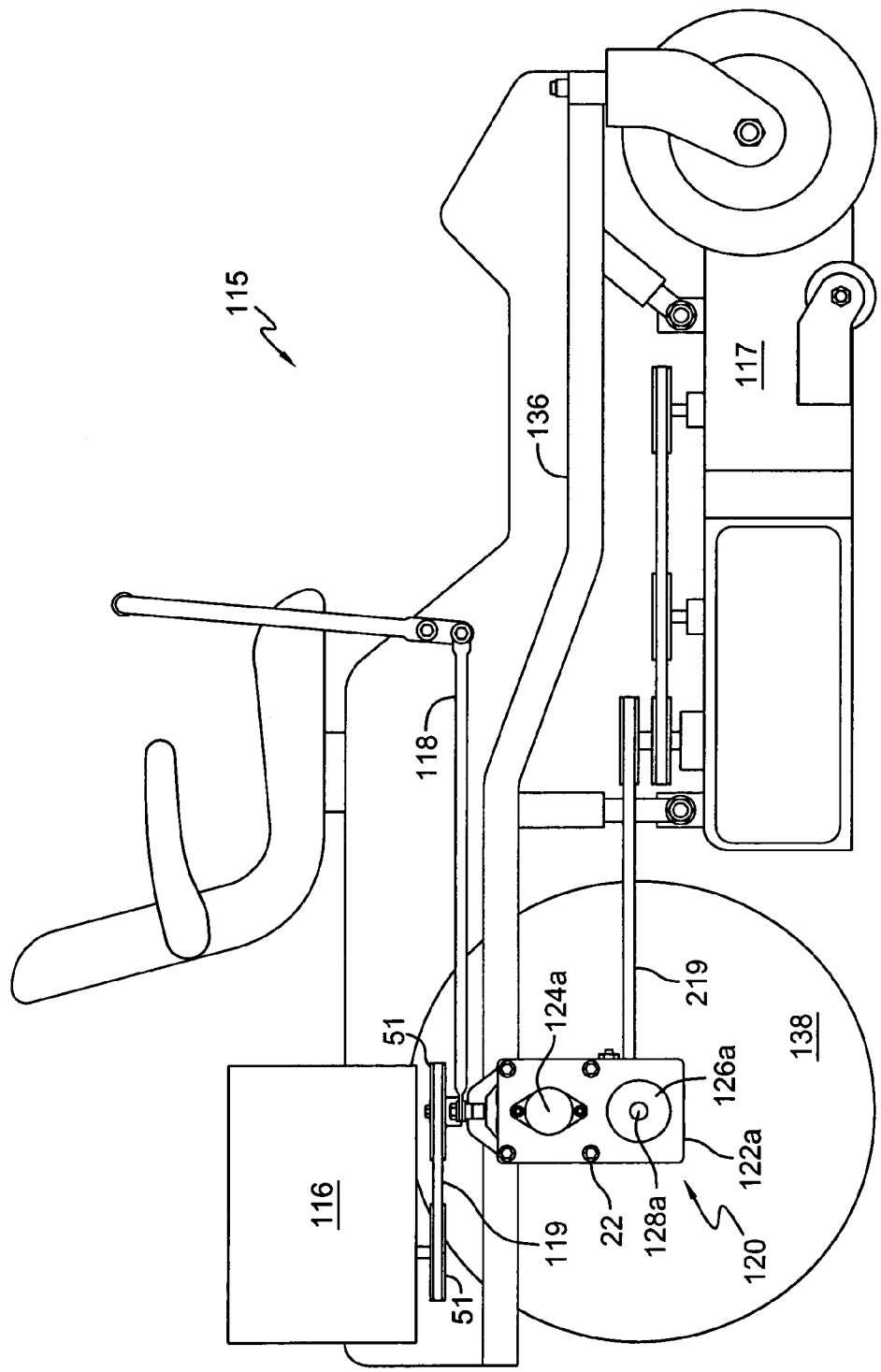
FIG. 1 is a vehicle employing a first embodiment of the drive assembly of the present invention.

The following is a description of multiple embodiments of this invention. Where appropriate, like numerals indicate identical or substantially identical components, and similar numerals with a different initial numeral indicate similar components with certain differences as specified. Further, in each of the embodiments discussed herein, identical numerals followed by "a" and "b" identify elements that are either identical or are mirror images of each other. Therefore, for convenience, the descriptions of elements with numerals followed by "a" may apply equally to elements with identical numerals followed by "b." Application of reference numerals in the aforementioned manner should have an obvious meaning to those with skill in the art.

Figure 2:
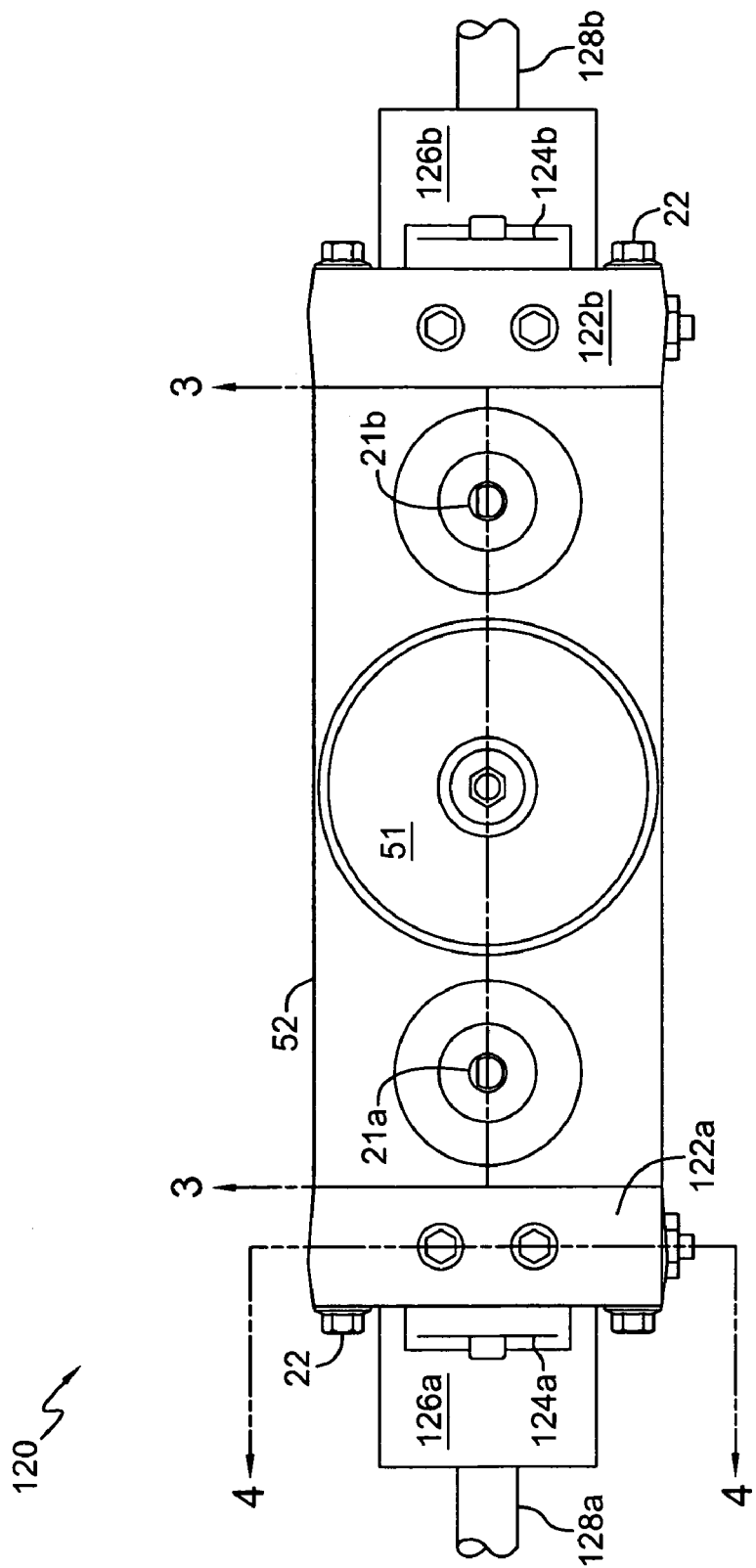
FIG. 2 is a top view of a first embodiment of the drive assembly.
Figure 3:
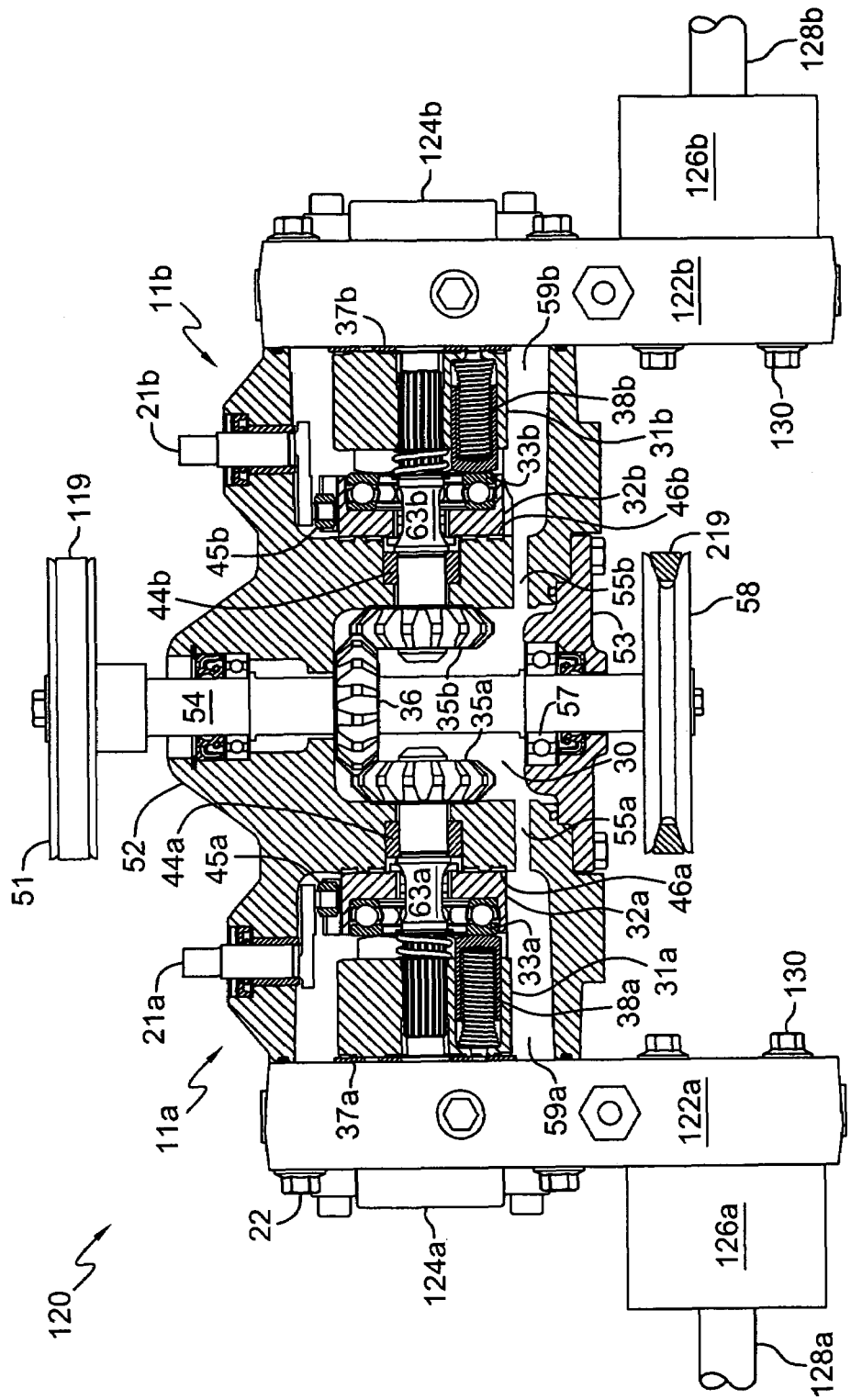
FIG. 3 is a cross-sectional front view of the drive assembly along the lines 3-3 in FIG. 2.

FIGS. 1, 2 and 3 depict a pump and motor assembly 120 having a housing 52. FIG. 1 depicts an exemplary vehicle 115 having a frame 136 on which assembly 120 is mounted. Engine 116 is mounted to frame 136 and is coupled to assembly 120 by means of belt 119. Assembly 120 is likewise coupled to deck 117 by belt 219. Linkage 118 is connected to and actuates trunnion arm 21, which is described in detail below. It will be understood by one of skill in the art that FIG. 1 depicts an exemplary embodiment rather than; a limiting one. Assembly 120 has many applications and is not limited to applications such as vehicle 115, nor is it limited to use with vehicles as there are industrial applications for such units FIGS. 3, 6, 7 and 8 are cross-sectional views of different embodiments of this invention. It will be understood that, for clarity, certain elements of these figures are not shown in cross-sectioning. By way of example, in FIG. 3 hydraulic motors 126a and 126b, center sections 122a and 122b, input shaft 54, gears 35a, 35b and 36, trunnions 21a and 21b and charge pumps 124a and 124b are not shown in cross section. The internal structure of such elements is generally known in the art and cross sectioning would not assist in the understanding of the invention. It will be understood, however, that different types of motors, pumps and center sections could be used in this invention, and that these items need not necessarily be identical on both sides of the unit.

In this embodiment, two generally identical pumps 11a and 11b are disclosed within unitary housing 52; as noted above, pumps 11a and 11b need not be identical and substantial variations are possible to one or the other within the scope of this invention. Pumps 11a and 11b are shown as the rotating axial piston type, although other designs could be used with minor modifications within the scope of this invention. Only certain elements of pump 11a and its related structure are described in detail herein, as the operation of such pumps is generally known in the art. The design of pumps 11a and 11b, housing 52 and related elements are similar to the disclosures in U.S. patent application Ser. Nos. 10/175,206 and 10/767,315 U.S. Pat. Nos. 6,705,840 and 7,056,101, both of which are commonly owned with this application, the terms of which are incorporated herein by reference.

Housing 52 includes two generally identical pump chambers or cavities 59a and 59b and a gear chamber or cavity 30 formed therebetween, thus providing an integral housing for pumps 11a and 11b. A case fluid passage 55a is formed in housing 52 to connect pump chamber 59a and gear chamber 30. Case fluid passage 55b similarly connects pump chamber 59b with gear chamber 30. Both fluid passages 55a and 55b permit hydraulic oil flow between pump chambers 59a and 59b and gear chamber 30. This arrangement permits the use of a single case drain (not shown) which can be formed anywhere in housing 52 to permit oil flow to a separate reservoir (not shown) mounted elsewhere on vehicle 115. If this case drain is in gear chamber 30, it will assist in preventing contamination of pumps 11a and 11b with debris from bevel gears 35a, 35b and 36, as well as assist in reduction of heat, as the warmer fluid from pumps 11a and 11b will be carried to the center of housing 52. A cover 53 is secured to the bottom of housing 52 to close gear chamber 30.

In each embodiment described herein, cavities 59a, 59b and 30 remain in fluid communication with one another. It will be appreciated by those in the art that pump chambers 59a and 59b and gear chamber 30 can be segregated from one another by housing 52. In such an embodiment, a plurality of case drains must be provided to remove oil from pump chambers 59a and 59b, respectively, and these separate case drains could be formed in a variety of locations.

Center sections 122a and 122b are mounted on opposite ends of housing 52 and act to seal pump chambers 59a and 59b, and may be secured thereto by screws 22 or other means. Center sections 122a and 122b could be referred to as porting plates, end caps or the like. As noted above, only center section 122a will be described herein.

Preferably, motor 126a is of the geroller type, but various other motor designs, such as axial piston motors and gear motors, may also be employed within the scope of this invention. Motors such as motor 126a are also generally well known in the art and, therefore, it also is not described in detail. Motor 126a is connected to center section 122a by fasteners 130, which are typically screws, but other fastening means may also be used. Motor 126a is connected to and drives output axle 128a, which in turn is connected to an output device, such as wheel 138.

Pump 11a on the left hand side of FIG. 3 comprises a pump cylinder block 31a having a plurality of axial pistons 38a mounted therein and it is mounted on a running surface formed on center section 122a.

Center section 122a may be preferably composed of cast iron, although it could also be aluminum or other materials depending on the application needs. The use of running plate 37a, also called a valve plate, to mount cylinder block 31a will add additional strength and durability, particularly if center section 122a is composed of aluminum. Cylinder block 31a could also run directly on a surface formed on center section 122a. Pump 11a is of the cradle mounted swash plate design; as shown in FIG. 3, swash plate 32a is mounted in pump chamber 59a on cradle bearings 46a mounted on an inner wall of housing 52. Pistons 38a run against swash bearing 33a mounted in swash plate 32a. Trunnion arm 21a is engaged to a control block 45a that is engaged to swash plate 32a, so that rotation of trunnion arm 21a causes movement of swash plate 32a to various stroked forward or reverse positions, or to the neutral position.

While trunnion arms 21a and 21b are shown extending out of housing 52 on the same side as and thus parallel to input shaft 54, it will be understood that trunnion arms 21a and 21b could be mounted on any side of housing 52, possibly requiring a corresponding change in the orientation of swash plates 32a and 32b, respectively, and also possibly requiring a change in the orientation of the porting in center sections 122a and 122b, respectively. Trunnion arms 21a and 21b need not be on the same side of housing 52. By way of example, if trunnion arm 21a is rotated 180° from the orientation shown, housing 52 would need to be modified, but the orientation of porting in center section 122a would not need to be changed. If, however, trunnion arm 21a was rotated 90° from the orientation shown so that it was on an adjacent side of housing 52, the porting in center section 122a would also need to be similarly rotated, along with the proper housing modifications. It will also be understood that other types of swash plates 32a and 32b, such as a trunnion mounted swash plate, could be used.

As will be obvious to one of ordinary skill in the art, optional elements, such as an oil cooler, external reservoir or expansion tank could easily be attached to pump and motor assembly 120. Various fittings and connections, such as housing or center section case drains and appropriate hydraulic lines, would be used to connect these elements to assembly 120 and to each other. These elements have been removed to simplify the drawings. Input shaft 54 extends into housing 52; as shown in FIG. 1, it can be driven by a prime mover such as engine 116 through pulleys 51 and belt 119, or some other means. In the embodiment shown in FIG. 3, input shaft 54 extends through both housing 52 and cover 53, which includes bearing 57 therein to support input shaft 54. An output pulley 58 may be attached to the end of shaft 54 to drive an auxiliary device, such as mower deck 117 as shown in FIG. 1 or other device. Cover 53 is strengthened to support bearing 57 used to rotatably support shaft 54 and the torque loads from output pulley 58.

Bevel gear 36 is mounted on input shaft 54 inside gear chamber 30 and is drivingly engaged to a first driven bevel gear 35a mounted on first pump shaft 63a. Bevel gear 36 is likewise drivingly engaged to a second driven bevel gear 35b which is similarly mounted on and driving second pump shaft 63b. A benefit of this design is that pump shafts 63a and 63b can be sized appropriately for their respective pumps 11a or 11b; only input shaft 54 needs to be sized appropriately to handle the torque of both pumps 11a and 11b as well as the torque requirements of the auxiliary device attached to output pulley 58.

Pump shaft 63a extends from gear chamber 30 into first pump chamber 59a and is engaged to and drivingly rotates pump cylinder block 31a. Bearing 44a provides support within housing 52. Pump shaft 63b also extends from gear chamber 30 into pump chamber 59b where it engages and drivingly rotates pump cylinder block 31b in a similar manner. As shown in, e.g., FIG. 3, input shaft 54 is generally perpendicular to pump shafts 63a and 63b and extends out the side of housing 52 as opposed to the ends thereof, which provides the user with flexibility in the application.

Pump shaft 63a extends through center section 122a into charge pump 124a. Charge pump 124a can be a gerotor or other style of charge pump, such as a vane pump, geroller, gear pump or any other known design. A charge pump for use in connection with a hydrostatic pump is shown, e.g., in commonly owned U.S. Pat. Nos. 5,555,727 and 5,628,189 the terms of which are incorporated herein by reference.

The location of input shaft 54 on the side of housing 52 permits the location of charge pumps 124a and 124b on opposite ends of housing 52. It is possible that only one of charge pumps 124a or 124b would be required, depending on the application for which apparatus 120 is to be used. Similarly, the output of one charge pump mounted on one center section could be attached by means of internal or external hoses or integral passages to provide charge pressure to the other pump associated with the other center section.

It will also be understood that these embodiments could include additional gear reduction. For example, in FIG. 3, a gear reduction could be used between bevel gear 36 on input shaft 54 and bevel gear 35a on pump shaft 63a. Likewise, a gear reduction could be used between bevel gears 36 and 35b. Furthermore, it will be understood that bevel gears 35, 36a and 36b could be replaced with another means for creating a right angle turn of the rotational force, such as helical gears, a worm gear driving a spur gear and the like.

Figure 4:
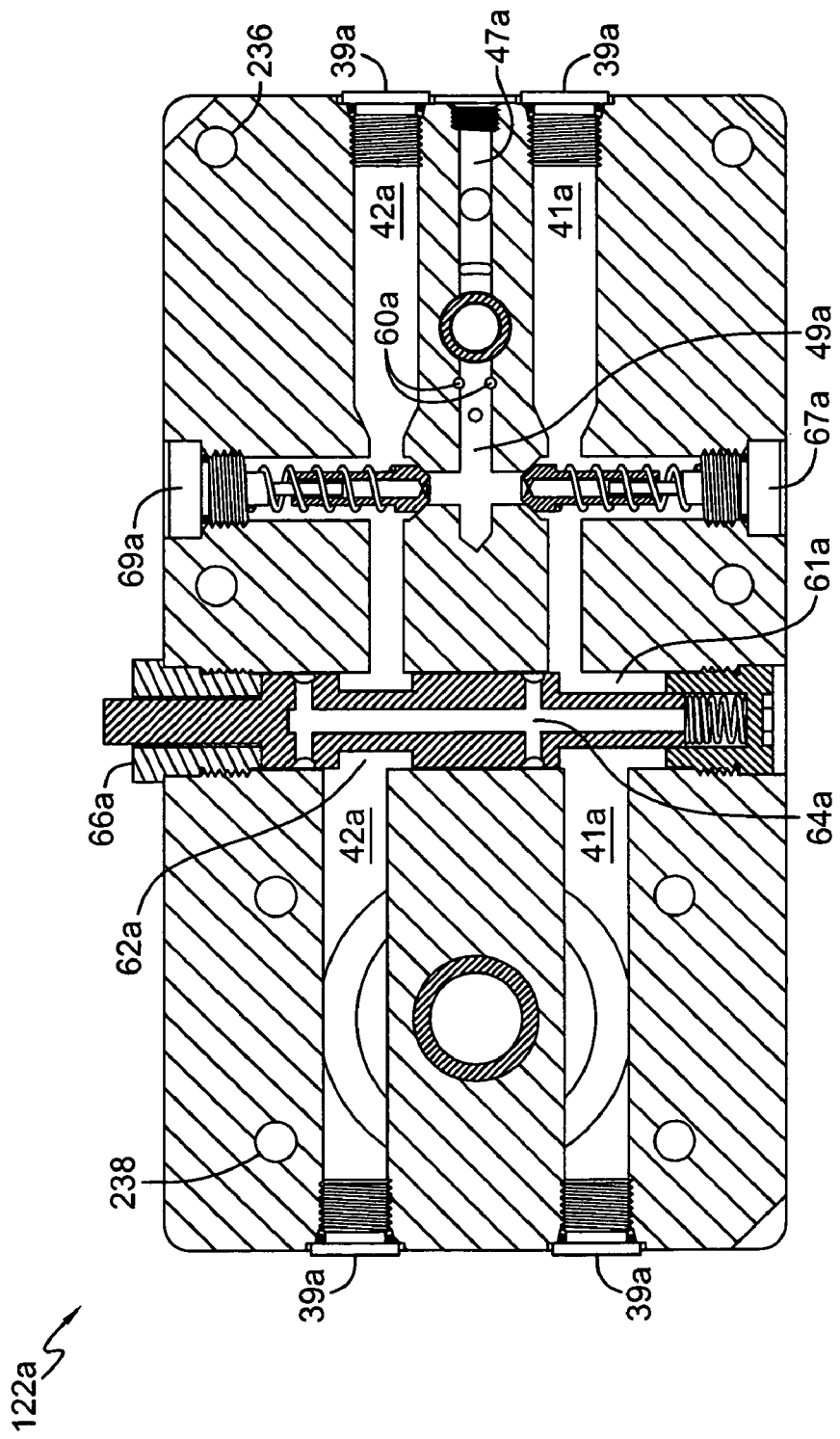
FIG. 4 is a cross-sectional view of the center section assembly along the lines 4-4 in FIG. 2.
Figure 5:
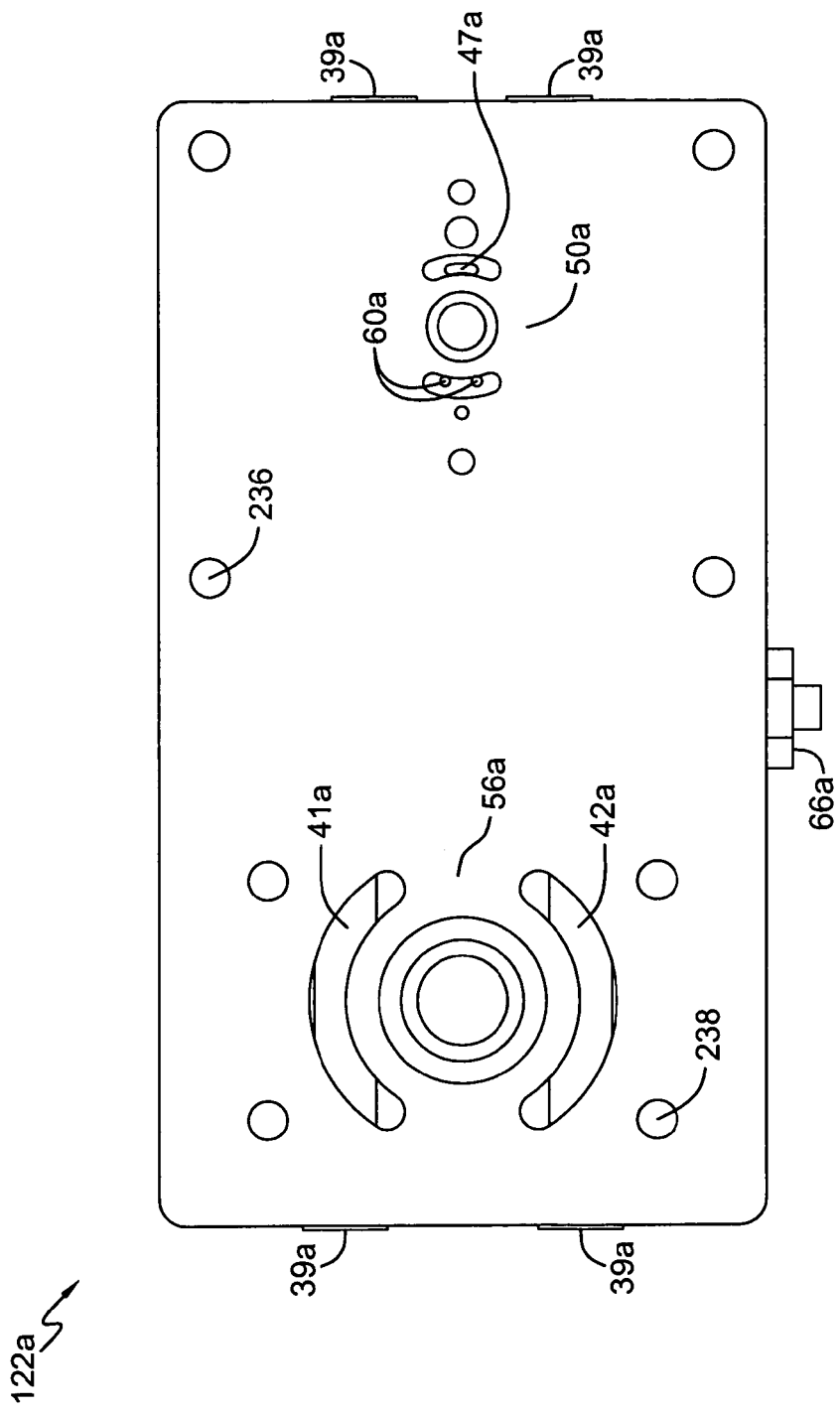
FIG. 5 is an external view of a center section assembly in accordance with a first embodiment of this invention.

Details of center section 122a are shown in FIGS. 4 and 5. Fluid for charge pump 124a is introduced into center section 122a through charge inlet 47a, which may further be connected to a separate reservoir (not shown) or may be connected to pump chamber 59a. Pressurized fluid from charge pump 124a is introduced through one or more passages 60a formed in center section 122a into charge gallery 49a. Pump 11a is connected to motor 126a through porting 41a and 42a, which may be closed by plugs 39a. As pump 11a is operated, one of porting 41a or 42a will be under pressure, and the other of porting 41a or 42a will be at vacuum pressure or at charge pressure. Hydraulic fluid leaks from a variety of places during operation of pump and motor assembly 120. The lost fluid is replaced when a check valve 67a or 69a opens in response to vacuum pressure or to pressure from charge pump 124a, permitting replacement or makeup fluid to enter porting 41a or 42a, respectively.

Because pump 11a, porting 41a, porting 42a, and motor 126a form a closed loop, and because there may be a need to back drive motor 126a, such as may occur if engine 116 becomes non-functional, a bypass valve 66a may be provided. Bypass valve 66a is typically positioned so that fluid flow in ports 41a and 42a is relatively unimpeded, for example, through annular areas 61a and 62a. When bypass valve 66a is actuated, fluid is permitted to flow between ports 41a and 42a by way of passages 64a formed in valve 66a, so that motor 126a is able to turn more freely.

FIG. 5 depicts an exterior view of center section 122a. Charge pump 124a is mounted to surface 50a. Motor 126a is mounted to surface 56a.

Figure 6:
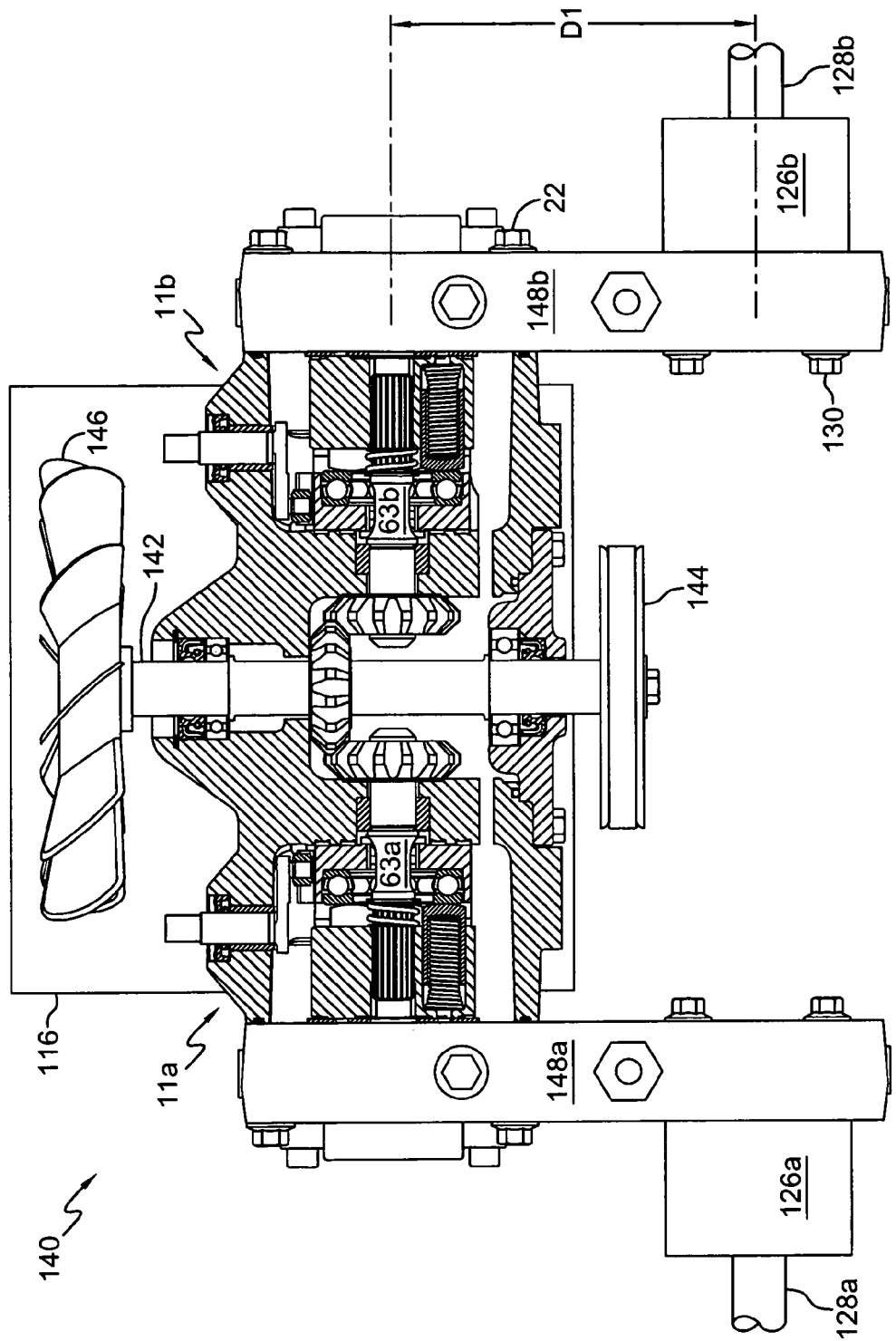
FIG. 6 is a cross-sectional front view similar to FIGS. 3 and 4 of a second embodiment of this invention.

FIG. 6 shows another embodiment of this invention, which is structurally and substantially similar to the embodiment shown in FIG. 3. FIG. 6 shows a pump and motor assembly 140, where the key differences from FIG. 3 center around input shaft 142. Specifically, in FIG. 6, input shaft 142 is driven by its prime mover 116 through pulley 144, which is located on the bottom of the unit instead of the top. Cooling fan 146 is attached to input shaft 142 at the end opposite from pulley 144. The use of such a fan can, in certain applications, eliminate the need for an oil cooler. This ability to modify the drive input location again improves the overall flexibility of the assembly.

Figure 7:
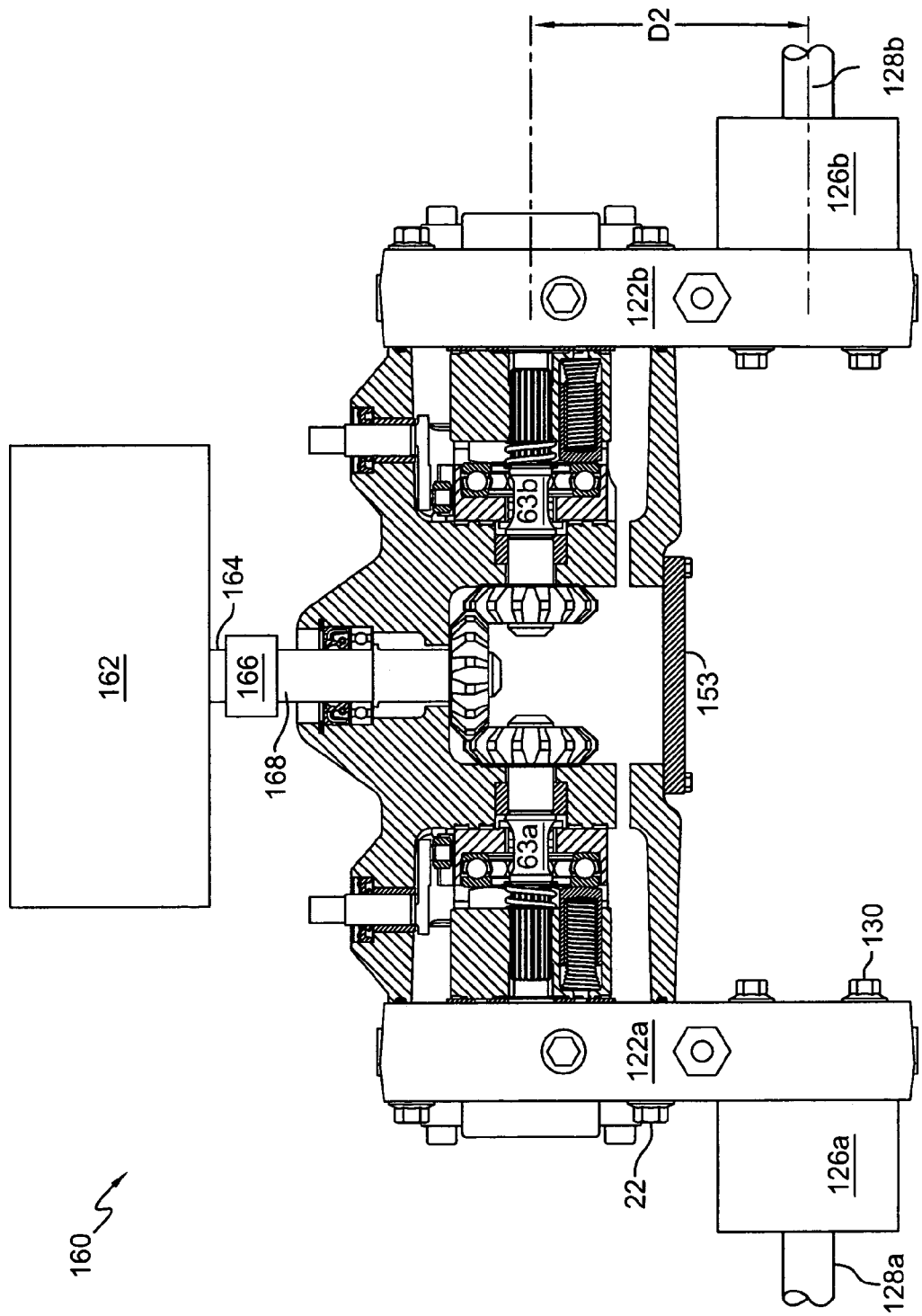
FIG. 7 is a cross-sectional front view similar to FIGS. 3 and 4 of a third embodiment of this invention.

FIG. 7 shows yet another embodiment of the invention which is also substantially similar to the embodiments depicted in FIGS. 3 and 6. Pump and motor assembly 160 includes an input shaft 168 coupled through coupler 166 to engine 162 output shaft 164. Coupler 166 may be of known design, such as using a powdered metal part with splines to interlock the two shafts 168 and 164; it could also be a cut steel part with a broached inner diameter to form the interlock. Such an embodiment eliminates the need for the pulleys shown in other embodiments and again increases the overall flexibility of the assembly constructed in accordance with the present invention. It will be appreciated by those in the art that either design, or any such similar design, will achieve the intended function.

Input shaft 168 does not extend through cover 153 in this embodiment and therefore cover 153 need not be additionally strengthened to support the torque loads from an output pulley, although this design could be modified to have such a pass through design as is shown in FIG. 3. In addition, center section 122b as shown in FIG. 7 has a different length than center section 148b as shown in FIG. 6. This difference in length varies the distance between output shafts 128a and 128b, as shown in FIG. 6, and pump shafts 63a and 63b. The length between output shafts 128a and 128b and pump shafts 63a and 63b can be varied depending on customer demand. The differing lengths are depicted as D1 in FIG. 6 and D2 in FIG. 7.

Figure 8:
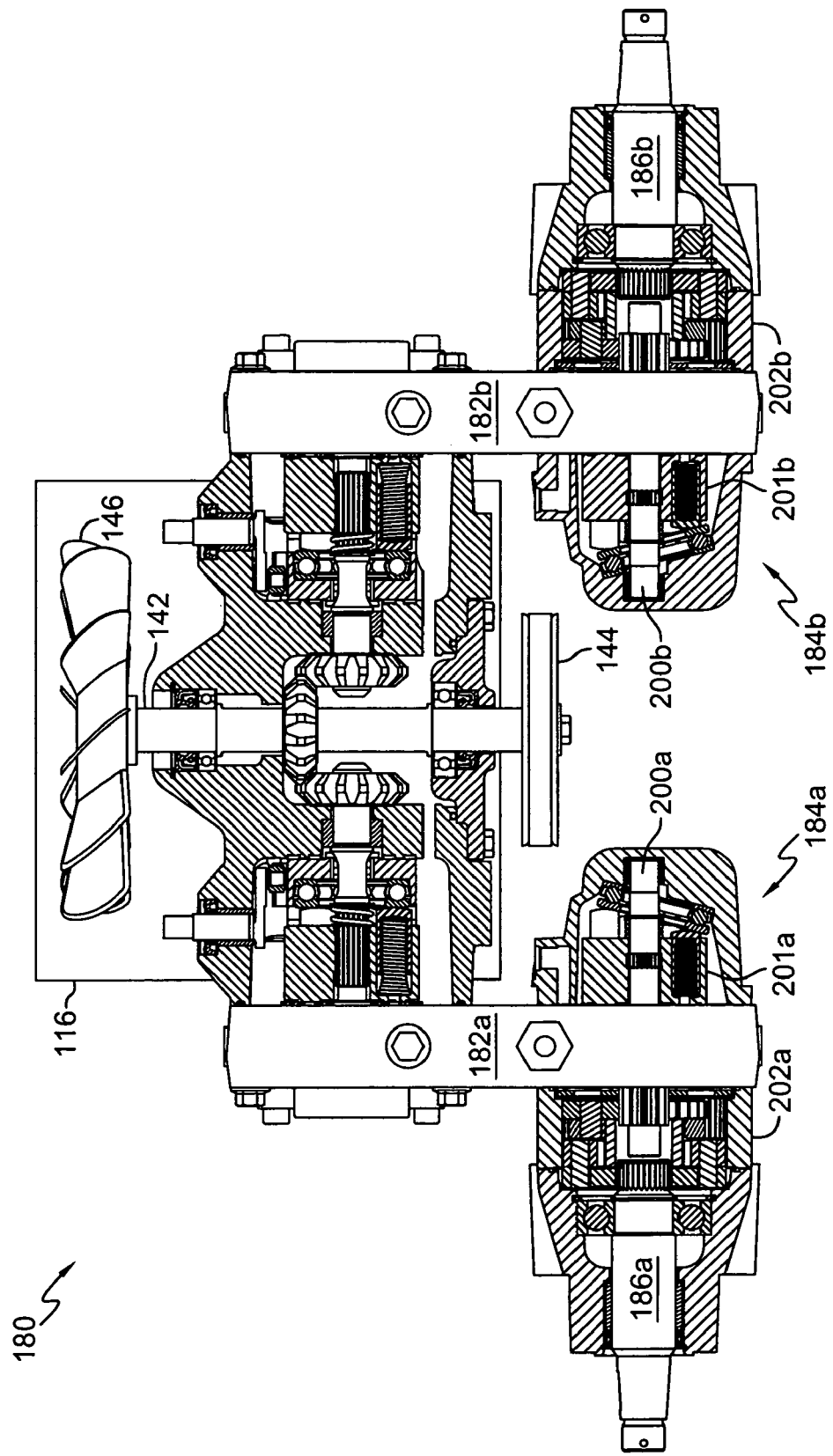
FIG. 8 is a partial cross-sectional front view of a fourth embodiment of this invention.

FIG. 8 shows a further embodiment of the invention that is structurally and substantially similar to the embodiment depicted in FIG. 6. FIG. 8 depicts a pump and motor assembly 180, wherein the key difference between the embodiments depicted in FIG. 6 and FIG. 8 is that motors 184a and 184b, which are attached to center sections 182a and 182b, are of the combination motor and gear reduction type that are generally described in commonly assigned U.S. Pat. No. 6,811,510, which is herein incorporated by reference. For convenience, only certain portions of motors 184a and 184b are described herein. Motor shaft 200a extends through center section 182a as depicted in FIG. 8. It is driven by cylinder block 201a, and is coupled to ring/planet gear assembly 202a. Gear assembly 202a is drivingly engaged to axle shaft 186a. An advantage of this embodiment is that a small efficient hydraulic motor and gear reduction may be used in place of a relatively inefficient all hydraulic reduction, as is typically used. Axle 186a is connected to an output, such as wheel 138 shown in FIG. 1.

Figure 9:
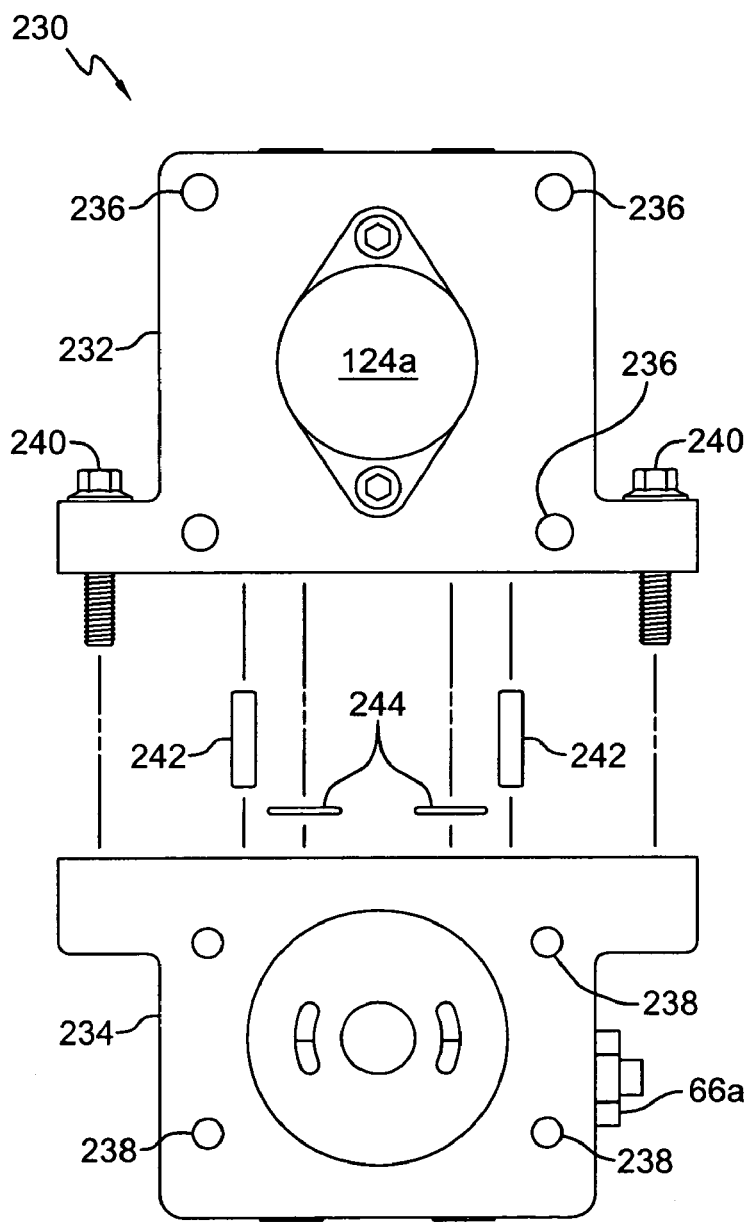
FIG. 9 is a detailed end view of an alternative embodiment of a center section assembly in accordance with the present invention.
Figure 10:
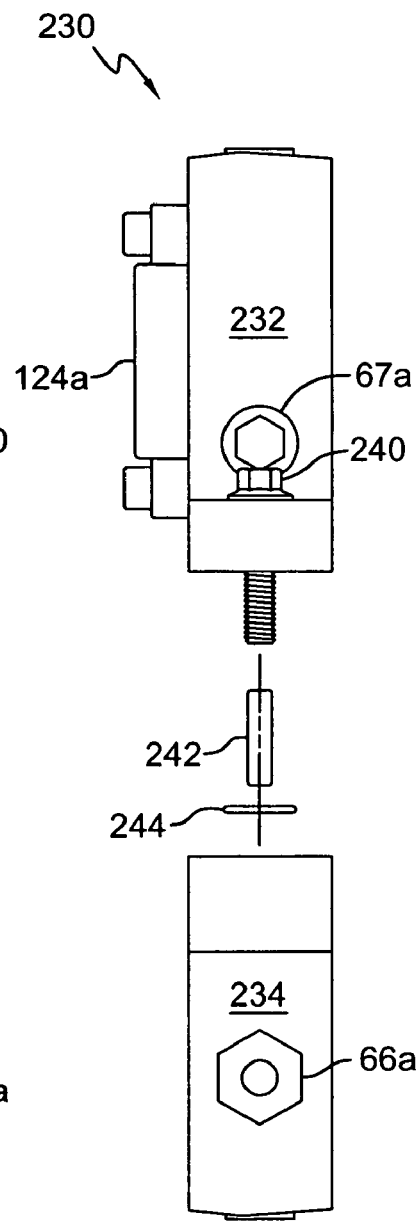
FIG. 10 is a detailed side view of the embodiment of the center section assembly depicted in FIG. 9.

In each of the previous embodiments, the center sections have each been depicted as being a one piece unit. FIGS. 9 and 10 depict an end view and side view, respectively, of an alternative embodiment of center section assembly 230, where pump portion 232 is separate and removable from motor portion 234. Portions 232 and 234 are affixed by fasteners 240, which may be screws, bolts, or any other similar fasteners. Dowels 242 may also be inserted into both portions 232 and 234 to further stabilize center section assembly 230. Assembly 230 is affixed to housing 52 by fasteners 22, which are inserted into openings 236. Motor 126a is affixed to motor portion 234 of assembly 230 by fasteners 130, which are inserted into openings 238. To prevent leakage, O-rings 244 are placed at porting where portions 232 and 234 join.

Figure 11:
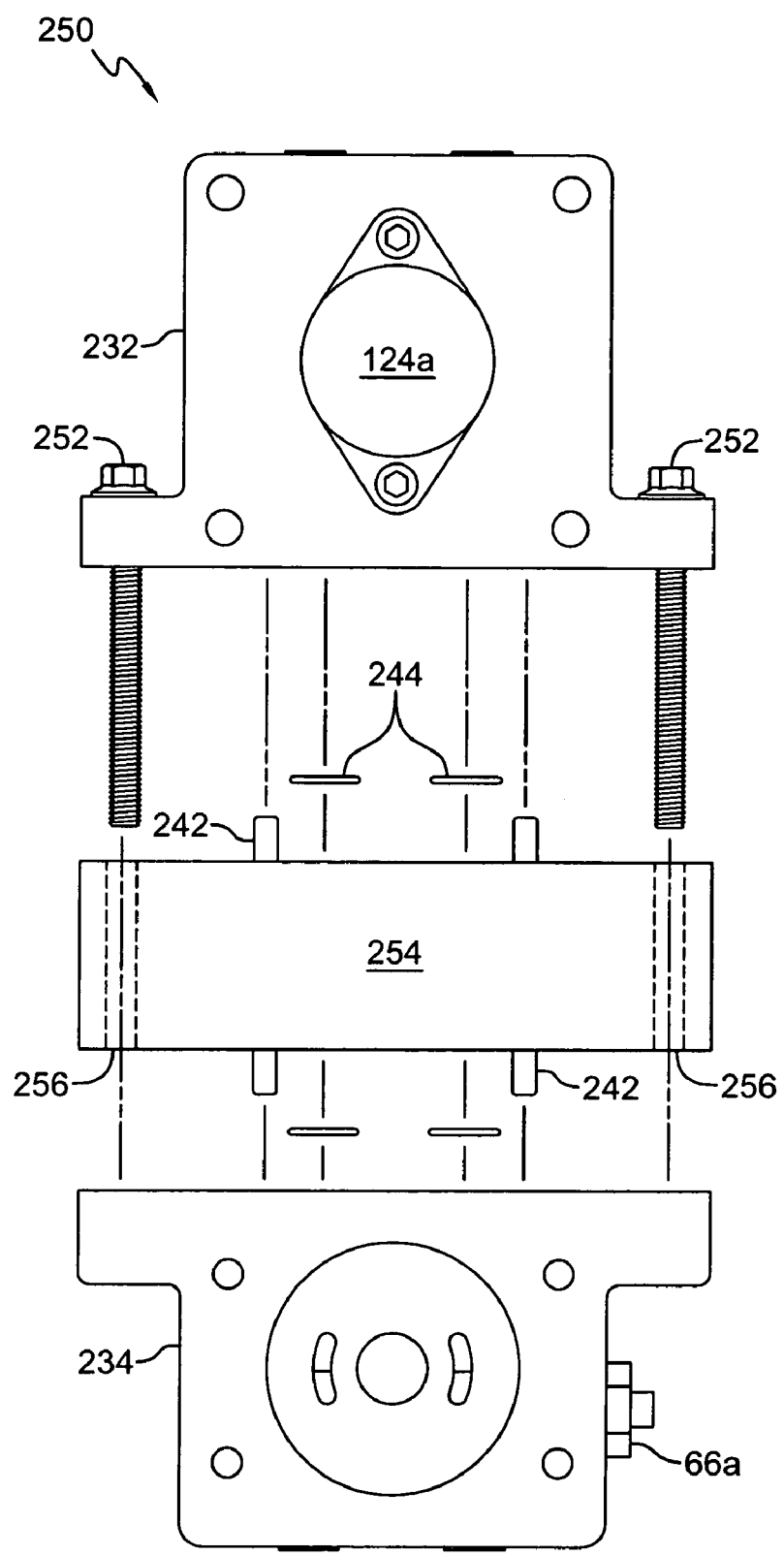
FIG. 11 is a detailed end view of a further alternative embodiment of the center section assembly in accordance with the present invention.

One advantage of this embodiment is that the distance, as shown as D1 in FIG. 6 and D2 in FIG. 7, between the pump shafts 63 and output shafts 128 or 186 can easily be varied for a variety of vehicle applications that might otherwise require multiple center sections of varying lengths. As shown in FIG. 11, center section assembly 250, which can be otherwise substantially similar to assembly 230 as shown in FIGS. 9 and 10, has spacer 254 is interposed between portions 232 and 234. Fasteners 252 are inserted through openings 256 and engage motor portion 234 to join pump portion 232, spacer 254 and motor portion 234 to one another. Dowels 242 may be inserted into pump portion 232, spacer 254 and motor portion 234 to further stabilize assembly 250. In order to prevent oil leakage, O-rings 244 may be placed at porting where pump portion 232 and spacer 254 join and where spacer 254 and motor portion 234 join.

Another embodiment of the present invention is shown in FIGS. 12-17. Similar to the first embodiment of the present invention described above and shown in FIGS. 1-5, this embodiment of pump and motor assembly 320 includes an engine 316, also known as a prime mover, mounted to frame 336, where frame 336 also supports assembly 320, mower deck 317 and other possible attachments. For attaching assembly 320 to engine 316, a bell housing 310 may be positioned between and secured to engine 316 and assembly 320. Similar to the embodiment shown in FIG. 7, main input shaft 354 of assembly 320 is coupled to the output shaft of engine 316. This embodiment also includes pumps 11a and 11b and center sections 122a and 122b, which are preferably nearly identical to those described above. In addition, trunnion arms 21a and 21b, swash plates 32a and 32b, and gears 35a, 35b and 36 are each preferably substantially similar to the similarly numbered elements described above and operate in the same manner.

Figure 12:
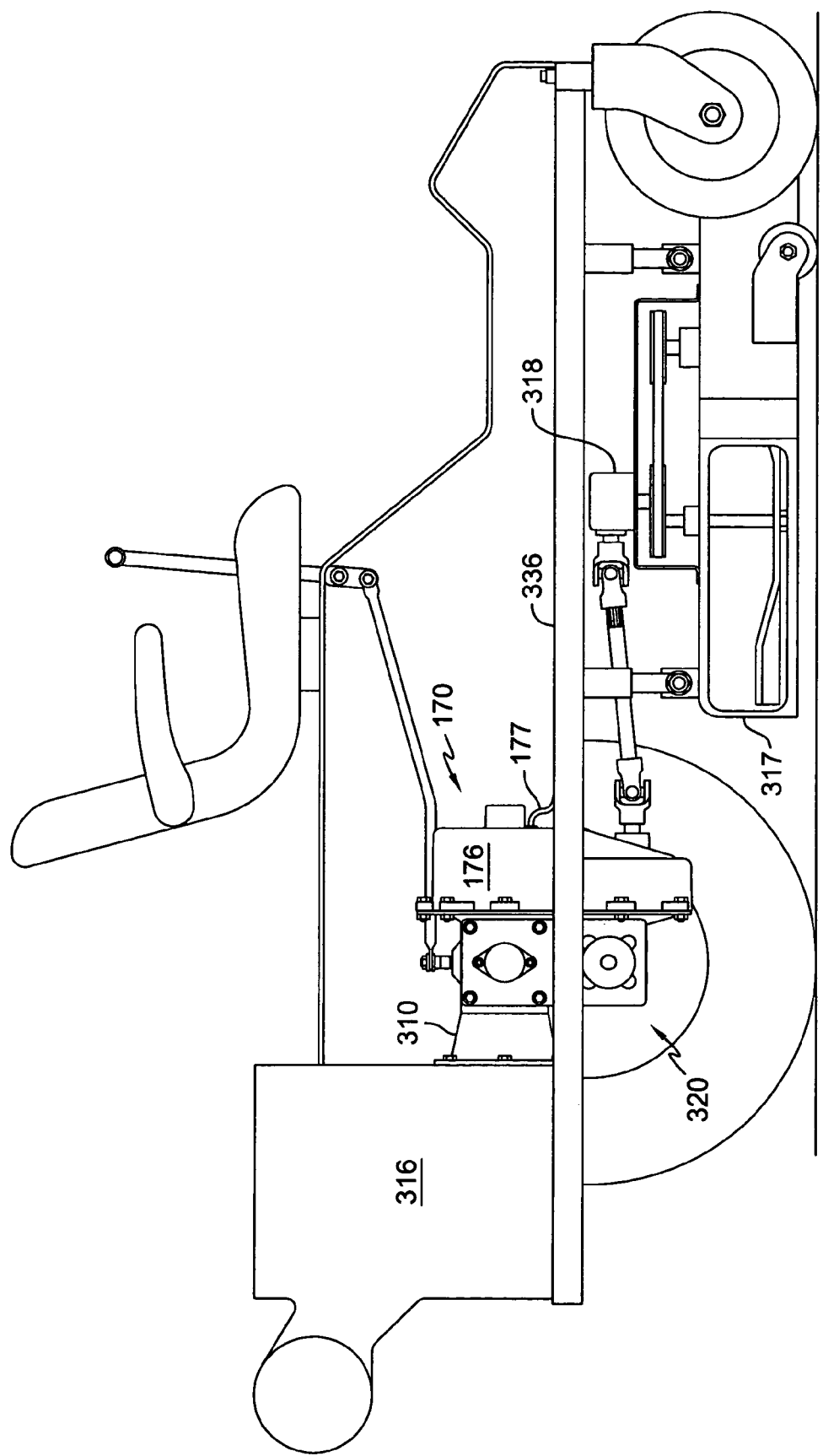
FIG. 12 depicts a vehicle employing a fifth embodiment of a drive assembly in accordance with the present invention.
Figure 13:
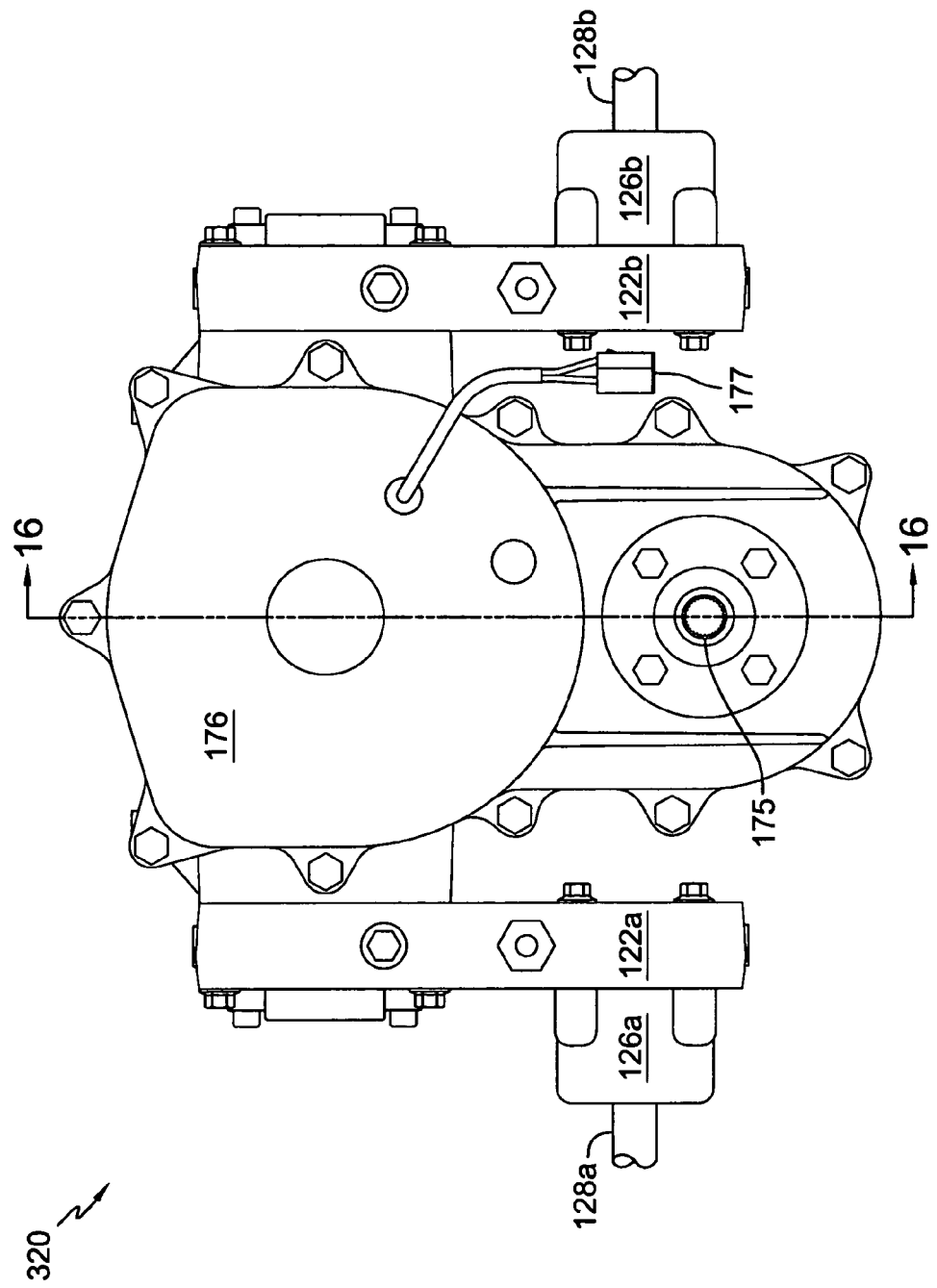
FIG. 13 depicts a front view of the drive assembly shown in FIG. 12.
Figure 14:
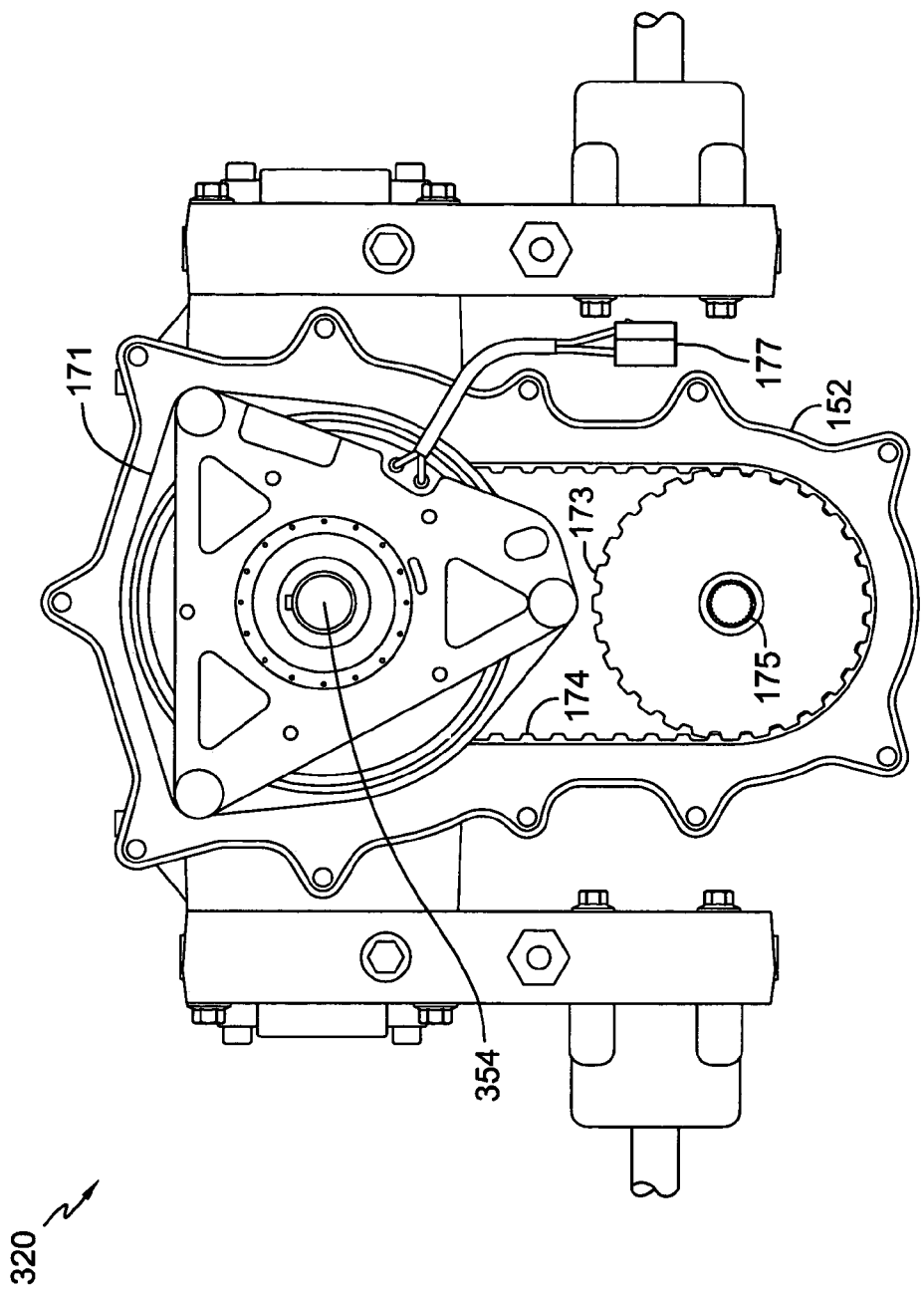
FIG. 14 depicts a front view of the drive assembly shown in FIG. 12 with the front cover of the housing removed.
Figure 15:
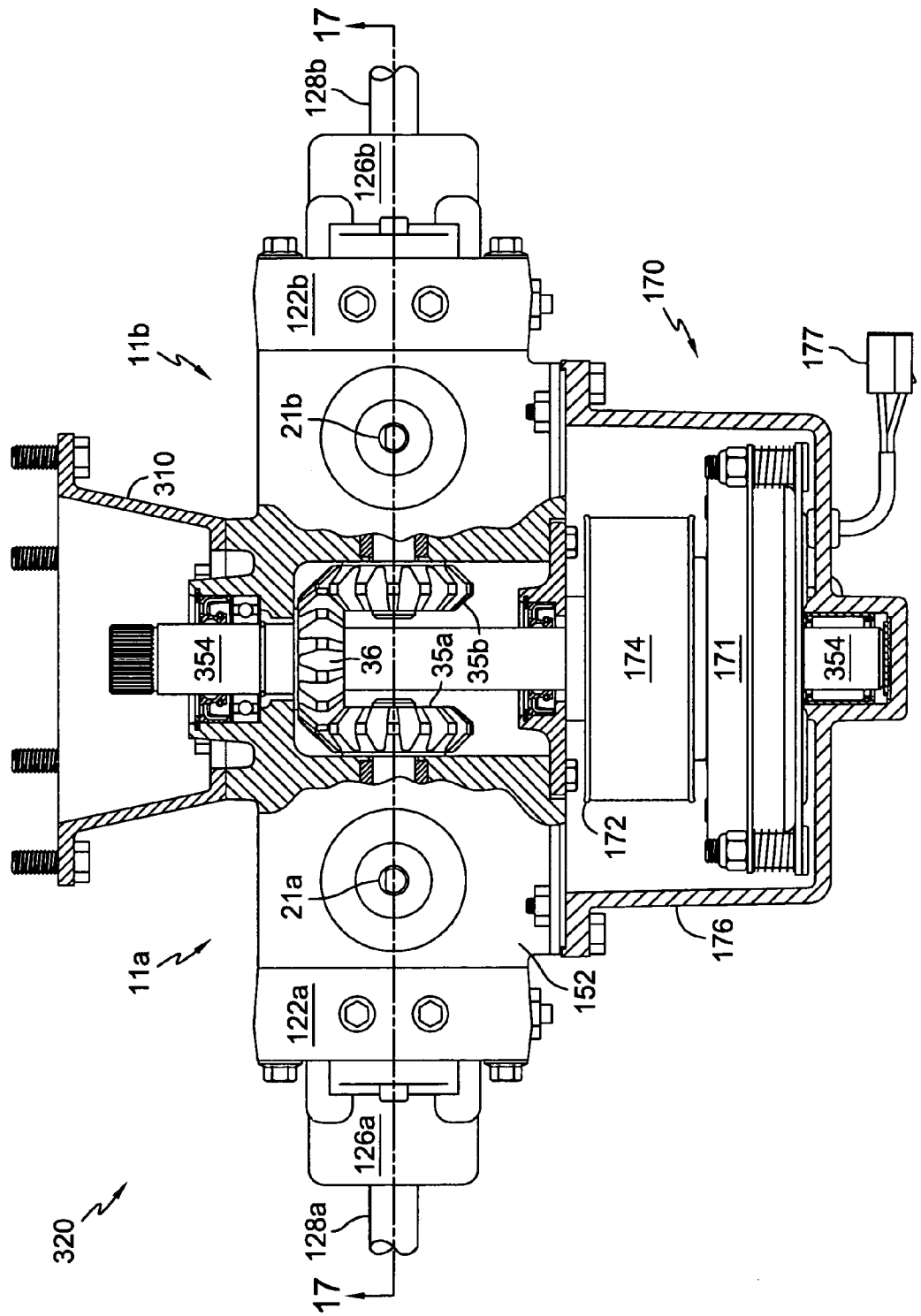
FIG. 15 depicts a top view of the drive assembly shown in FIG. 12 with a portion of the drive assembly shown as a cross-sectional view.
Figure 16:
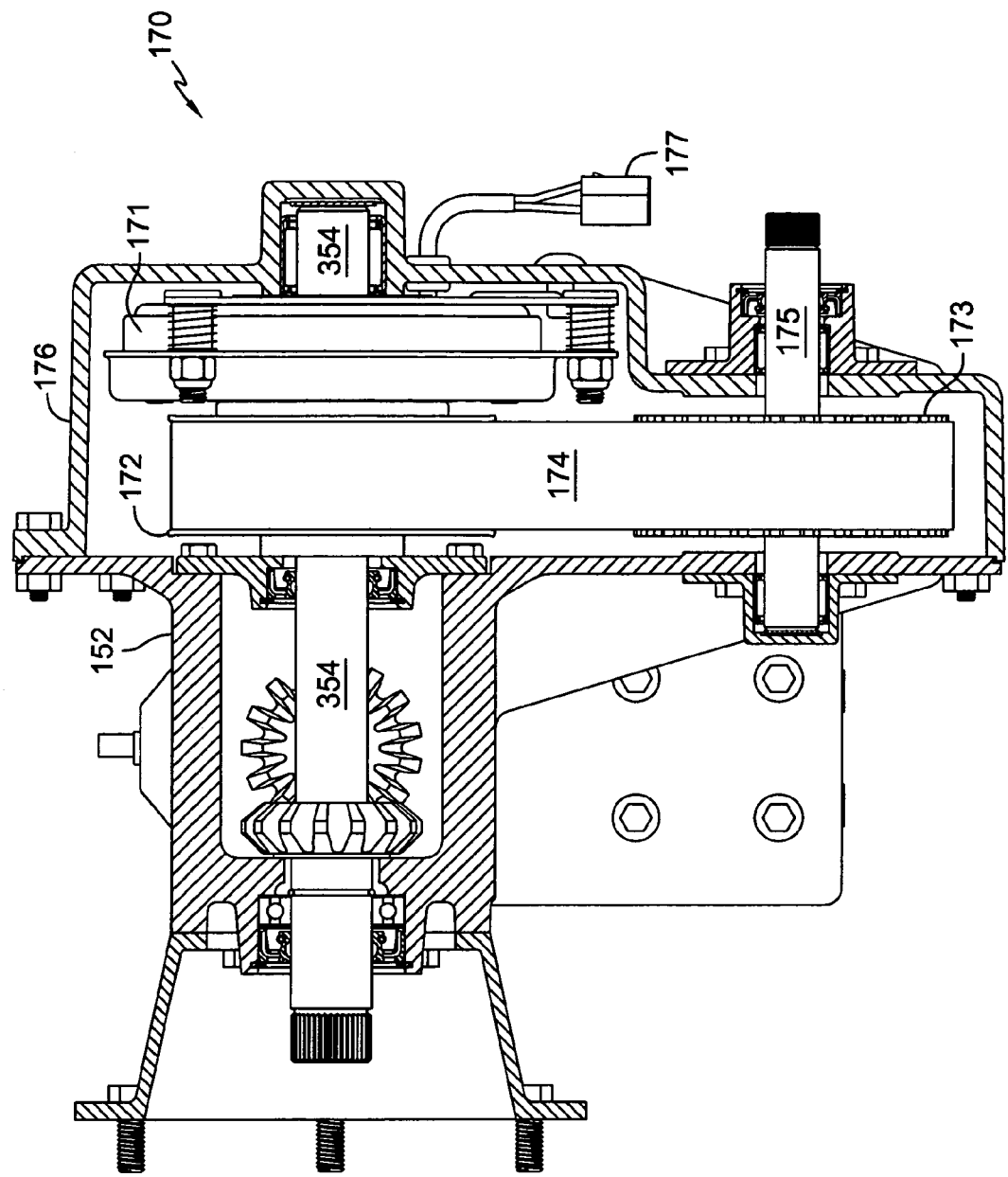
FIG. 16 depicts a partial cross-sectional side view of the drive assembly shown in FIG. 13 taken along lines 16-16.
Figure 17:
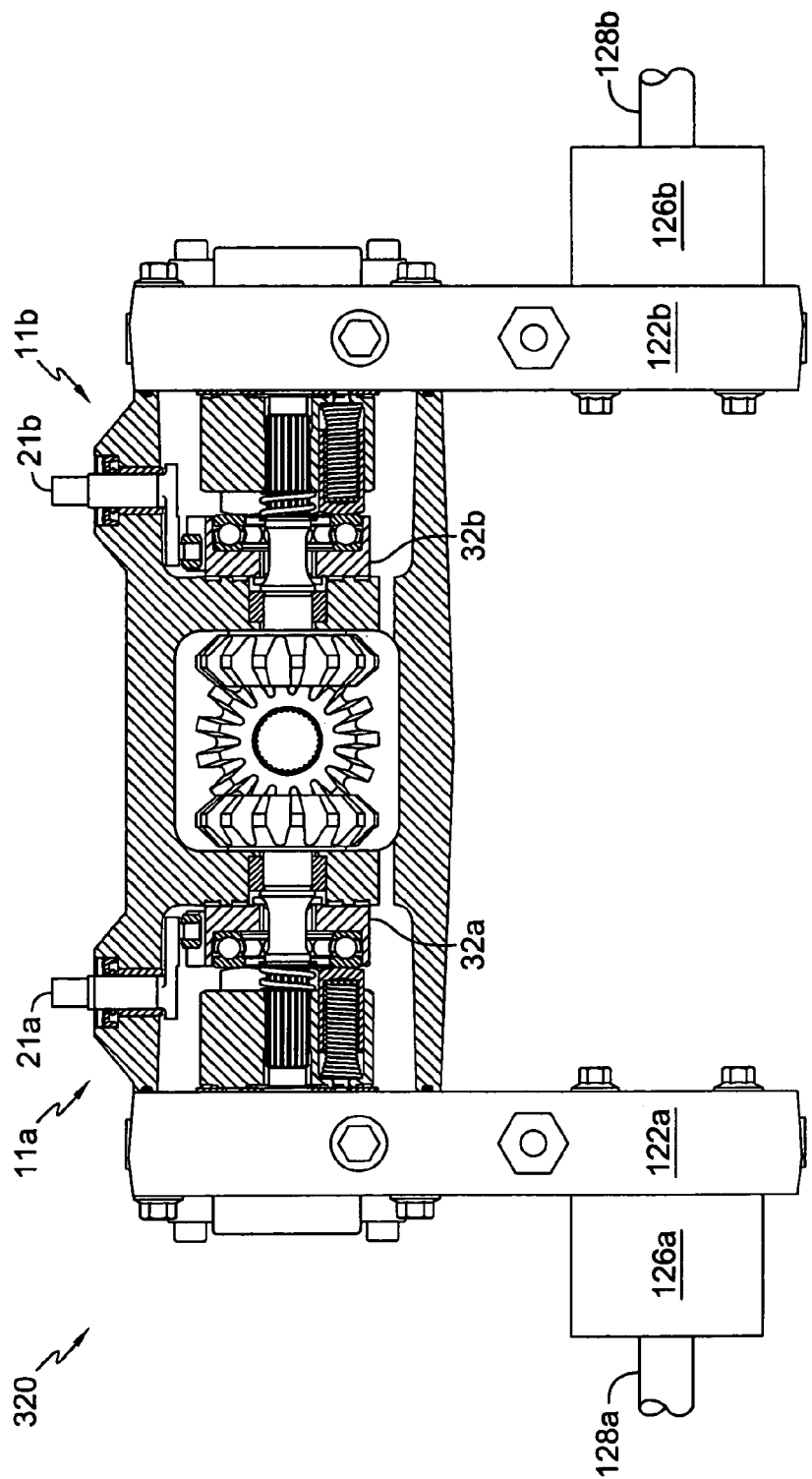
FIG. 17 depicts a front view of the drive assembly shown in FIGS. 12 and 15 taken along lines 17-17 in FIG. 15 with a portion of the drive assembly shown as a cross-sectional view.

For powering a mower deck 317, deck lift or other auxiliary device, a power take off assembly 170 may also be provided. As shown in FIGS. 12, 15 and 16, power take off assembly 170 may be positioned on the opposite side of assembly 320, as compared to bell housing 310. For driving power take off assembly 170, main input shaft 354 may extend outside of housing 152. Power take off assembly 170 also includes an output shaft 175, which may be drivingly coupled to right angle gear box 318 for powering mower deck 317. To actuate power take off assembly 170, an electric clutch 171, having a power connection 177 to connect it to the vehicle battery or other source of power, may be associated with main input shaft 354 and act to couple first pulley 172 to main input shaft 354. Furthermore, first pulley 172 may be drivingly coupled by belt 174 to a second pulley 173, which is fixedly attached to and drives output shaft 175. Output shaft 175 may be positioned below main input shaft 354 and may form a substantially collinear relationship with gear box 318, which will provide for a more efficient transfer of power from output shaft 175 to gear box 318 and mower deck 317. For supporting one end of main input shaft 354 and to protect electric clutch 171, pulleys 172, 173, output shaft 175 and main input shaft 354 from water and other debris, power take off cover 176 may be provided. Power take off cover 176 may be secured to housing 152 so as to create an environmental seal therewith or to create a water tight seal, as needed. It should be appreciated by those with skill in the art that electric clutches are common in the industry and that other variations of clutches may also be used to couple first pulley 172 to main input shaft 354.

While specific embodiments of the invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof.

What is claimed is:

1. A hydraulic drive apparatus driven by a prime mover, comprising:
   a housing having a first pump chamber, a second pump chamber and a gear chamber;
   a first pump rotatably mounted in the first pump chamber;
   a first pump shaft drivingly engaged to the first pump;
   a second pump rotatably mounted in the second pump chamber;
   a second pump shaft drivingly engaged to the second pump;
   an input shaft driven by the prime mover, the input shaft extending into the gear chamber and drivingly engaged to the first and second pump shafts;
   a first center section with hydraulic porting formed therein and a second center section with hydraulic porting formed therein, wherein the center sections are secured to opposite ends of the housing;
   a power take off unit driven by the input shaft; and
   a first hydraulic motor attached to the first center section and hydraulically connected to the first pump and a second hydraulic motor attached to the second center section and hydraulically connected to the second pump.

2. The drive apparatus as set forth in claim 1, further comprising a bell housing positioned between the gear chamber and the prime mover and attached to the prime mover and the housing.

3. The drive apparatus as set forth in claim 2, wherein the bell housing is attached to a side of the prime mover.

4. The drive apparatus as set forth in claim 3, wherein the first hydraulic motor and the second hydraulic motor are vertically offset from the input shaft.

5. The drive apparatus as set forth in claim 1, wherein the power take off unit comprises a first pulley engageably coupled to the input shaft, an electric clutch for engaging and disengaging the first pulley to and from the input shaft and a second pulley drivingly attached to the first pulley, wherein the second pulley is drivingly engaged to the input shaft by actuation of the clutch.

6. The drive apparatus as set forth in claim 5, wherein the power take off unit further comprises a power take off output shaft that is fixedly coupled to the second pulley and a mower deck input.

7. The drive apparatus as set forth in claim 6, wherein the power take off output shaft is generally parallel to and offset from the input shaft.

8. A hydraulic drive apparatus, comprising:
   a housing having a first pump chamber, a second pump chamber and a gear chamber;
   a first pump rotatably mounted in the first pump chamber;
   a first pump shaft drivingly engaged to the first pump;
   a second pump rotatably mounted in the second pump chamber;
   a second pump shaft drivingly engaged to the second pump and generally coaxial with the first pump shaft;
   a first center section with hydraulic porting formed therein and attached to one side of the housing;
   a first motor attached to the first center section;
   a second center section with hydraulic porting formed therein and attached to an opposite side of the housing from the first center section;
   a second motor attached to the second center section;
   a bell housing attached to the housing;
   a power take off unit attached to the housing opposite the bell housing; and
   an input shaft having a first end and a second end mounted in and extending through the housing generally perpendicular to each of the pump shafts and drivingly engaged to the first and second pump shafts, wherein the first end of the input shaft extends from one side of the housing into the bell housing and the second end of the input shaft extends from an opposite side of the housing to engage the power take off unit.

9. The hydraulic drive apparatus of claim 8, wherein the first motor and the second motor are vertically offset from the first pump and the second pump, respectively.

10. The hydraulic drive apparatus of claim 8, wherein the power take off unit further comprises an output shaft that is generally parallel to the input shaft.

11. The hydraulic drive apparatus of claim 10, wherein the output shaft extends from the housing in a direction that is generally opposite the bell housing.

12. The hydraulic drive apparatus of claim 8, wherein the power take off unit further comprises a first pulley engageably coupled to the input shaft, an electric clutch for engaging and disengaging the first pulley to and from the input shaft and a second pulley drivingly attached to the first pulley by a belt.

13. A hydraulic drive apparatus, which is driven by a prime mover, comprising:
   a bell housing attached to the prime mover;
   an assembly attached to the bell housing, the assembly having a plurality of pumps, where each of the pumps are drivingly engaged to a respective pump shaft;
   a plurality of hydraulic motors corresponding to the number of pumps, each of the hydraulic motors being hydraulically connected to a corresponding pump;
   a main input shaft drivingly coupled to a prime mover output at a first end and to a power take off unit at a second end, where the prime mover output and the main input shaft are substantially coaxial, the main input shaft is drivingly coupled to the pump shafts, and the pump shafts are substantially perpendicular to the main input shaft; and the power take off unit mounted to the assembly opposite the bell housing, the power take off unit being further comprised of a first pulley engageably coupled to the main input shaft, an electric clutch for engaging and disengaging the first pulley to and from the main input shaft and a second pulley drivingly attached to the first pulley by a belt.

14. The drive apparatus as set forth in claim 13, wherein the second pulley is drivingly engaged to the main input shaft by actuating the clutch.

15. The drive apparatus as set forth in claim 14, wherein the power take off unit further includes a power take off output shaft that is fixedly coupled to the second pulley and a mower deck.

16. The drive apparatus as set forth in claim 15, wherein the power take off output shaft is positioned below the main input shaft.

17. The drive apparatus as set forth in claim 13, wherein an output axle extends from and is driven by each of the hydraulic motors.

18. The drive apparatus as set forth in claim 13, wherein each of the pump shafts is drivingly coupled to a charge pump.

19. The drive apparatus as set forth in claim 13, wherein the main input shaft extends through the assembly.

20. A hydraulic drive apparatus, which is driven by a prime mover, comprising:

a bell housing attached to the prime mover;

an assembly attached to the bell housing, the assembly having a plurality of pumps;

a main input shaft drivingly coupled to each of the pumps, the main input shaft having a first end drivingly connected to the prime mover and a second end drivingly connected to a power take off unit mounted to the assembly opposite the bell housing; and wherein the power take off unit is further comprised of a first pulley engageably coupled to the main input shaft, an electric clutch for engaging and disengaging the first pulley to and from the main input shaft, a second pulley drivingly attached to the first pulley by a belt, and a power take off output shaft that is fixedly coupled to the second pulley and a mower deck.

21. The drive apparatus as set forth in claim 20, wherein the second pulley is drivingly engaged to the main input shaft by actuation of the clutch.

22. The drive apparatus as set forth in claim 21, wherein the power take off output shaft is positioned below the main input shaft.

23. The drive apparatus as set forth in claim 22, wherein both ends of the input shaft extend from opposite sides of the assembly.

\* \* \* \* \*